Jan. 2, 1934.    G. S. LANE    1,942,029
DISK BRAKE
Filed Oct. 28, 1930
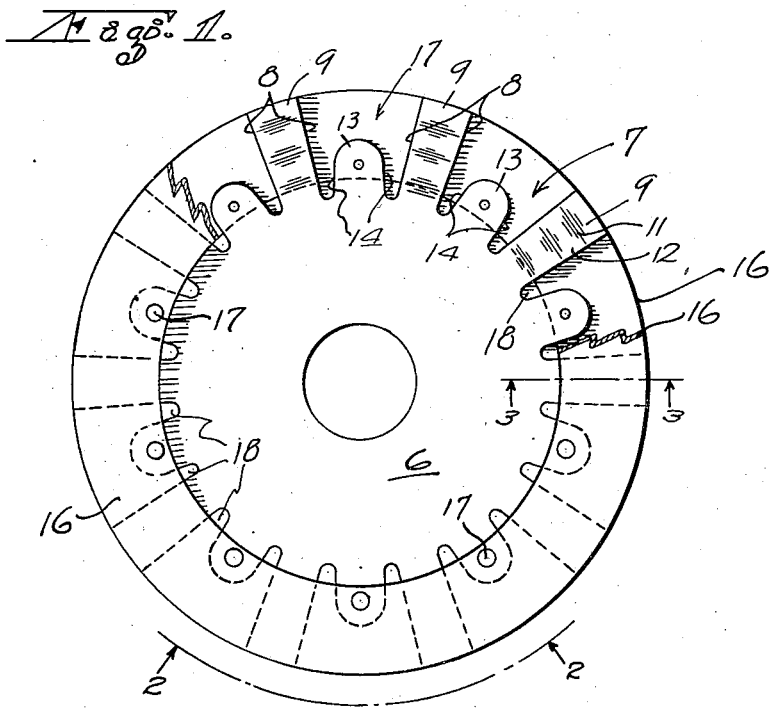
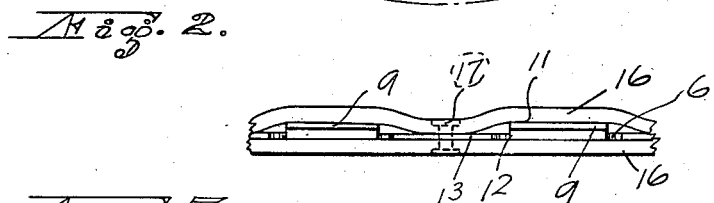
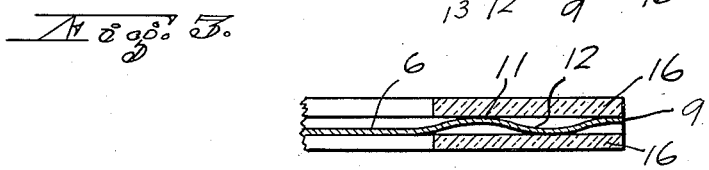
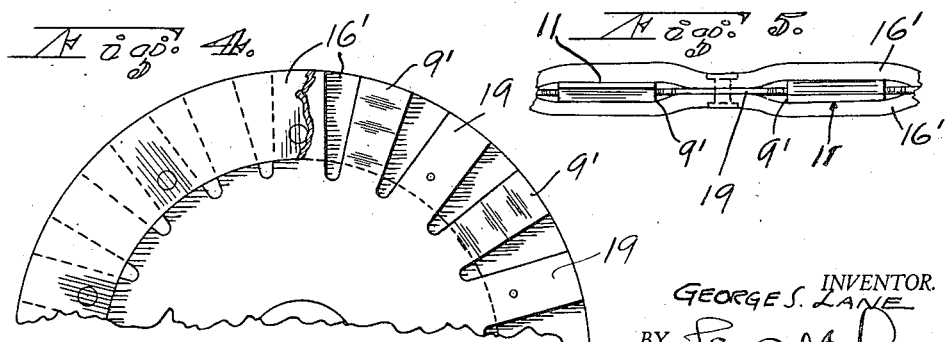
GEORGE S. LANE  INVENTOR.
BY
ATTORNEYS.

UNITED STATES PATENT OFFICE 1,942,029

DISK BRAKE

George S. Lane, San Anselmo, Calif., assignor to Wallace Sheehan, San Francisco, Calif., as trustee Application October 28, 1930. Serial No. 491,696

17 Claims. (Cl. 188—72)

This invention relates to disk brakes.

It is the primary object of the invention to provide a disk construction for disk brakes, on which the frictional contact is equalized throughout the entire surface, and corrected in accordance with the pressure exerted upon the disk, so as to provide an efficient disk brake of equalized frictional area and pressure.

This application is related to my application for clutch and brake mechanisms, Serial No. 410,973, filed December 2, 1929.

It is particularly an object of the invention to provide a mat disk with transversely corrugated fingers confined between opposed friction facings or rings on the mat so as to allow for the dilatation and contraction of the fingers, thereby to adjust and equalize the pressure on the facings.

Other objects and advantages are to provide a disk brake that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawing wherein,

Fig. 1 is a face view of the disk, part of the lining or facing being broken away.

Fig. 2 is a fragmental edge view of the disk, viewing the same in the direction of the arrows 2—2 on Fig. 1.

Fig. 3 is a fragmental, sectional view of the disk, the section being taken on the line 3—3 of Fig. 1.

Fig. 4 is a fragmental face view of a modified embodiment of the brake disk.

Fig. 5 is a fragmental edge view of the modified embodiment of the disk.

In carrying out my invention, I make use of a mat disk 6, in the periphery of which are cut a plurality of widened V-shaped slots or cut away portions 7, the edges 8 of which are radial. Thus a plurality of radial fingers 9 are formed. The side edges of each finger 9 are converging toward the center of the disk and diverging toward the outer periphery of the disk. Each finger 9 has alternate ridges 11 and valleys 12 on the opposite faces thereof, so as to form corrugations transversely to the axes of the respective fingers.

In each slot 7, between the inner ends of the adjacent fingers 9, is provided a radial extension lug 13 on the disk 6. The side edges 14 of each lug 13 are parallel with each other and with the radial center line of the lug 13.

A lining or friction facing 16 is disposed on each face of the disk 6. The linings 16 are secured to the lugs 13. The securing rivets 17 of the linings 16 extend through the lugs 13, thus leaving the fingers 9 free to longitudinally expand and contract between the facings 16.

The linings or facings 16 are formed in ring shape, the width of the ring being smaller than the length of the fingers 9. The outer peripheries of the facings 16 are substantially in alignment with the outer ends of the fingers 9, while the inner peripheries of the ring facings 16 are spaced from the inner corners 18 of the slots or cut-away portions 7 to leave a cooling or ventilating passage thereat.

It is to be noted that the corrugations of the fingers are cut on the same radius. In the embodiment shown in Figs. 1 and 2, the outer end of the fingers 9 terminate in ridges 11, all the said ridges 11 bearing against the inner face of the same facing 16. In the embodiment shown in Fig. 5, the corrugations are so formed that the outermost ridges 9 thereof project in opposite directions on alternate fingers 9, whereby the fingers 9 provide alternate points of contacting support on the inner faces of the opposite facings 16.

The facings 16 are slightly indented at the point where the securing rivets 17 extend therethrough. In the form in Fig. 2 only one of the facings is indented because the lugs 13 extend in the plane of the outer face of the ridges 11 on one side of the fingers 9.

In the form shown in Figs. 4 and 5, the extensions 19 are of the same length as the fingers 9', and the corrugations of the fingers 9' are arranged alternately in opposite directions as heretofore stated. The extension 19 is therefore substantially in the center plane of the space between the facings 16', so that both of the facings 16' are indented around the securing rivets 17'.

In all the embodiments of my invention the fingers resiliently space opposed portions of the facings on the opposite sides of the mat disk, leaving other portions unsupported. The facings therefore yield slightly under pressure exerted thereon to equalize the pressure. The resiliency of the facing arrangement is uniform throughout the entire friction areas of the facings. The ratio between the supported and unsupported portions of the friction area is such as to result in a pressure distribution whereby the resulting circumferential friction contact is substantially equal at all radii of the disk. The resiliency and the unsupported area of the facings is increased from the inner toward the outer peripheries of the facings substantially in proportion to the increase of the circumferential friction area at the respective radii.

Having thus described this invention, what I claim and desire to secure by Letters Patent is:

1. In a device of the character described a disk, a plurality of fingers formed on the disk and being extended to the outer periphery of the disk, a lining on each side of the disk to enclose the fingers therebetween; means on each finger providing for the longitudinal dilation and contraction thereof; and an extension on the disk between each pair of adjacent fingers and adjacent to the inner ends of said fingers, the said facings being secured to said extensions leaving the fingers free to dilate and contract.

2. In a device of the character described a disk, a plurality of fingers formed on the disk and being extended to the outer periphery of the disk, a lining on each side of the disk to enclose the fingers therebetween; means on each finger providing for the longitudinal dilation and contraction thereof and an extension on the disk between each pair of adjacent fingers and adjacent to the inner ends of said fingers, the said facings being secured to said extensions leaving the fingers free to dilate and contract, said extensions being shorter than the said fingers.

3. In a device of the character described a disk, a plurality of fingers formed on the disk and being extended to the outer periphery of the disk, a lining on each side of the disk to enclose the fingers therebetween, means on each finger providing for the longitudinal dilation and contraction thereof, the side edges of each finger being divergent and radial, and an extension on the disk between each pair of adjacent fingers and adjacent to the inner ends of said fingers, the said facings being secured to said extensions leaving the fingers free to dilate and contract.

4. In a device of the character described a disk, a plurality of fingers formed on the disk and being extended to the outer periphery of the disk, a lining on each side of the disk to enclose the fingers therebetween, means on each finger providing for the longitudinal dilation and contraction thereof, the side edges of each finger being divergent and radial, and an extension on the disk between each pair of adjacent fingers and adjacent to the inner ends of said fingers, the said facings being secured to said extensions leaving the fingers free to dilate and contract, the side edges of each extension being substantially parallel with each other.

5. In a device of the character described, a mat disk, a friction facing on each face of the disk, a plurality of radial fingers formed on said disk and adapted to resiliently space opposed portions of the facings, leaving other opposed portions of the facings unsupported intermediate the adjacent fingers; and radial extensions on the disk disposed between the adjacent fingers, said facings being secured to said extensions.

6. In a device of the character described, a mat disk, a friction facing on each face of the disk, a plurality of radial fingers formed on said disk and adapted to resiliently space opposed portions of the facings, leaving other opposed portions of the facings unsupported intermediate the adjacent fingers, each finger being provided with alternate transverse ridges and valleys to allow dilation and contraction of said fingers between the facings.

7. In a device of the character described, a mat disk, a friction facing on each face of the disk, a plurality of radial fingers formed on said disk and adapted to resiliently space opposed portions of the facings, leaving other opposed portions of the facings unsupported intermediate the adjacent fingers, each finger being provided with alternate transverse ridges and valleys to allow dilation and contraction of said fingers between the facings; and radial extensions of the disk disposed between the adjacent fingers, said facings being secured to said extensions, to leave said fingers free to expand and contract.

8. In a device of the character described, a mat disk, a friction facing on each face of the disk, a plurality of radial fingers formed on said disk and adapted to resiliently space opposed portions of the facings, leaving other opposed portions of the facings unsupported intermediate the adjacent fingers, the spacing between the adjacent fingers widening toward the outer periphery of the disk.

9. In a device of the character described, a mat disk, a friction facing on each face of the disk, a plurality of radial fingers formed on said disk and adapted to resiliently space opposed portions of the facings, leaving other opposed portions of the facings unsupported intermediate the adjacent fingers, the spacing between the adjacent fingers widening toward the outer periphery of the disk; and radial extensions on the disk disposed between the adjacent fingers, said facings being secured to said extensions.

10. In a device of the character described, a mat disk, a friction facing on each face of the disk, a plurality of radial fingers formed on said disk and adapted to resiliently space opposed portions of the facings, leaving other opposed portions of the facings unsupported intermediate the adjacent fingers, the spacing between the adjacent fingers widening toward the outer periphery of the disk, each finger being provided with alternate transverse ridges and valleys to allow dilation and contraction of said fingers between the facings.

11. In a device of the character described, a mat disk, a friction facing on each face of the disk, a plurality of radial fingers formed on said disk and adapted to resiliently space opposed portions of the facings, leaving other opposed portions of the facings unsupported intermediate the adjacent fingers, radial extensions on the disk disposed between the adjacent fingers, said facings being secured to said extensions, each finger being provided with alternate transverse ridges and valleys to allow dilation and contraction of said fingers between the facings, to leave said fingers free to expand and contract.

12. In a device of the character described, a mat disk, a friction facing on each face of said disk, a plurality of transversely corrugated fingers formed on the disk with freedom of dilation and contraction to space opposed portions of the facings with uniform resiliency throughout the entire circumferential area of the facings at each radial distance, and means outside of said fingers to secure the fingers to the disk.

13. In a device of the character described, a mat disk, a friction facing on each face of said disk, a plurality of transversely corrugated fingers formed on the disk with freedom of dilation and contraction to space opposed portions of the facings with uniform resiliency throughout the entire circumferential area of the facings at each radial distance, each friction facing being formed as a ring to cover the respective faces of the fingers from the outer periphery thereof to a distance spaced from the inner ends thereof to leave the inner corners of the spaces between the fingers uncovered, and means between said fingers to secure the disk to the facings.

14. In a device of the character described, a mat disk, a friction facing on each face of said disk, a plurality of transversely corrugated fingers formed on the disk with freedom of dilation and contraction to space opposed portions of the facings with uniform resiliency throughout the entire circumferential area of the facings at each radial distance, each friction facing being formed as a ring to cover the respective faces of the fingers from the outer periphery thereof to a distance spaced from the inner ends thereof to leave the inner corners of the spaces between the fingers uncovered; and radial extensions on the disk disposed between the adjacent fingers, said facings being secured to said extensions.

15. In a clutch disk for use in the plate type of clutch, a pair of spaced substantially ringlike friction facings, a hub, a plurality of fingers extended radially from the hub and between the facings; means adjacent one circumference of the ringlike facings to secure the facings and the fingers together, said fingers being so spaced from each other as to permit the unsecured portions of the facings to be resiliently pressed toward each other by pressure exerted on said facings.

16. In a device of the character described, a disk; a plurality of fingers formed on the disk and being extended to the outer periphery thereof, each of said fingers having deformed portions extending out of the plane of the disk, which portions flatten under pressure into the plane of the disk; a lining on each side of the disk to enclose the fingers therebetween; and extensions on the disk equal in number to the fingers and adjacent the inner ends of the fingers, the said linings being secured to said extensions leaving the fingers free to be flattened when subjected to pressure applied to the opposite linings.

17. In a device of the character described; a disk; a plurality of fingers formed on the disk and being extended to the outer periphery thereof, each of said fingers having deformed portions extending out of the plane of the disk, which portions flatten under pressure into the plane of the disk; radial extensions on the disk spaced inwardly from the circumference thereof, said extensions being of shorter length than the fingers; and a lining on each side of the disk to enclose the fingers therebetween, said linings being secured to said extensions leaving the fingers free to be flattened when subjected to pressure applied to the opposite linings.

GEORGE S. LANE.